US006894813B2

(12) United States Patent
Spencer et al.

(10) Patent No.: US 6,894,813 B2
(45) Date of Patent: May 17, 2005

(54) INTEGRATED IMAGING MODULE FOR WIDE FORMAT SCANNER

(75) Inventors: Christopher J. Spencer, Shortsville, NY (US); Daniel P. White, Honeoye Falls, NY (US); David A. Bartman, Webster, NY (US)

(73) Assignee: Xerox Corporation, Stamford, CT (US)

( * ) Notice: Subject to any disclaimer, the term of this patent is extended or adjusted under 35 U.S.C. 154(b) by 750 days.

(21) Appl. No.: 09/761,493

(22) Filed: Jan. 16, 2001

(65) Prior Publication Data

US 2002/0093696 A1 Jul. 18, 2002

(51) Int. Cl.[7] .............................. H04N 1/40; H04N 1/04
(52) U.S. Cl. ........................ 358/483; 471/474; 471/496
(58) Field of Search ................................. 358/471, 496, 358/473, 474, 483, 482, 497, 400, 401, 505, 506, 500, 501, 487, 472, 509, 512, 513, 514, 494; 399/211; 257/678, 680, 724, 730; 250/208.1, 234–236; 382/312, 313, 318, 319

(56) References Cited

U.S. PATENT DOCUMENTS

| 4,318,135 | A | | 3/1982 | Allis et al. ................... 358/474 |
|---|---|---|---|---|
| 4,542,414 | A | | 9/1985 | Nagane ....................... 358/482 |
| 4,686,581 | A | | 8/1987 | Spehrley, Jr. et al. ........ 358/494 |
| 5,194,725 | A | * | 3/1993 | Sawase et al. ............ 250/208.1 |
| 5,281,803 | A | | 1/1994 | Ishizuka ................... 250/208.1 |
| 5,517,332 | A | * | 5/1996 | Barry et al. ................ 358/496 |
| 5,579,114 | A | | 11/1996 | Imamura ..................... 358/482 |
| 5,912,746 | A | | 6/1999 | Cilke et al. ................. 358/482 |
| 6,166,832 | A | * | 12/2000 | Fujimoto ..................... 358/484 |

FOREIGN PATENT DOCUMENTS

| EP | 0 508 709 A2 | 4/1992 |
|---|---|---|
| EP | 1 017 221 A1 | 8/1998 |

OTHER PUBLICATIONS

Daniel L. Morris et al., "Multiple Function Calibration For Document Scanner",.

* cited by examiner

Primary Examiner—Cheukfan Lee
(74) Attorney, Agent, or Firm—David J. Arthur

(57) ABSTRACT

An integrated image module for a document scanner includes a one piece die cast housing having a datum element and a support element. An imaging sensor array is enclosed in the housing. An array bias element urges the imaging sensor array against the datum element to provide accurate placement of the sensor array relative to the housing. A transport mechanism is attached to the housing so that the position of the transport mechanism accurately corresponds to the position of the imaging sensor array. The lens and the lamp for illumination are also attached to the housing so that the primary components of the imaging portion of the scanner are contained in a single module.

14 Claims, 6 Drawing Sheets

INTEGRATED IMAGING MODULE FOR WIDE FORMAT SCANNER

FIELD OF THE INVENTION

The present invention relates to document scanning devices. In particular, the present invention relates to assembly of the components relating to imaging and transport.

BACKGROUND OF THE INVENTION

A document scanner receives light reflected from a document, and converts the image on the document into an electronic format for further processing. Digital scanners use digital photosensors that convert the light reflected from the document into digital electronic information. A lens may focus the document image onto the digital photosensors. Alternatively, the linear array of photosensors may extend across the entire width of the document to be scanned. The linear array of photosensors may be moved along the documents, or the document may be moved past the linear array of photosensors. In certain instances, it may be possible to scan the document using digital photosensors that move in a predetermined pattern, such as a raster format.

For accurate processing of a scanned document image, it is helpful to accurately control the relative positions of the optical elements, such as the lens and the photosensors, and the transport mechanism for moving the paper past the photosensors, or for moving the photosensors past the document to be scanned.

SUMMARY OF THE INVENTION

The present invention provides improved apparatus and methods for providing highly accurate relative placement of the imaging sensor elements and the transport mechanisms of a document scanner.

In accordance with an aspect of the present invention, an image module for a document scanner includes a housing having a datum element and a support element, and an imaging sensing array. An array bias element urges the imaging sensor array against the datum element of the housing. A transport mechanism is attached to the housing.

In accordance with an additional aspect of the present invention, a document scanner includes a housing having a datum element and a support element. An imaging sensor array including a sensor board that has a forward edge and a rearward edge, and a front surface and a back surface, and a plurality of sensor elements on the front surface of the sensor board. A spring clip abuts the rearward edge of the imaging sensor array to urge the forward edge of the imaging sensor array against the datum element of the housing. A lens is positioned above the sensor elements of the imaging sensor array, and a lamp is mounted on the housing. A transport mechanism is attached to the housing for moving the housing and a document relative to one another.

In accordance with the method of the present invention, a method of assembling a document scanner includes providing a housing having a support element and a datum element, placing an imaging sensor array on the support surface of the housing, and urging the imaging sensor array against the datum element. A document transport mechanism is attached to the housing, and a bottom cover is attached to the housing to enclose the imaging sensor array inside the housing.

DETAILED DESCRIPTION OF A PREFERRED EMBODIMENT

Figure 1:
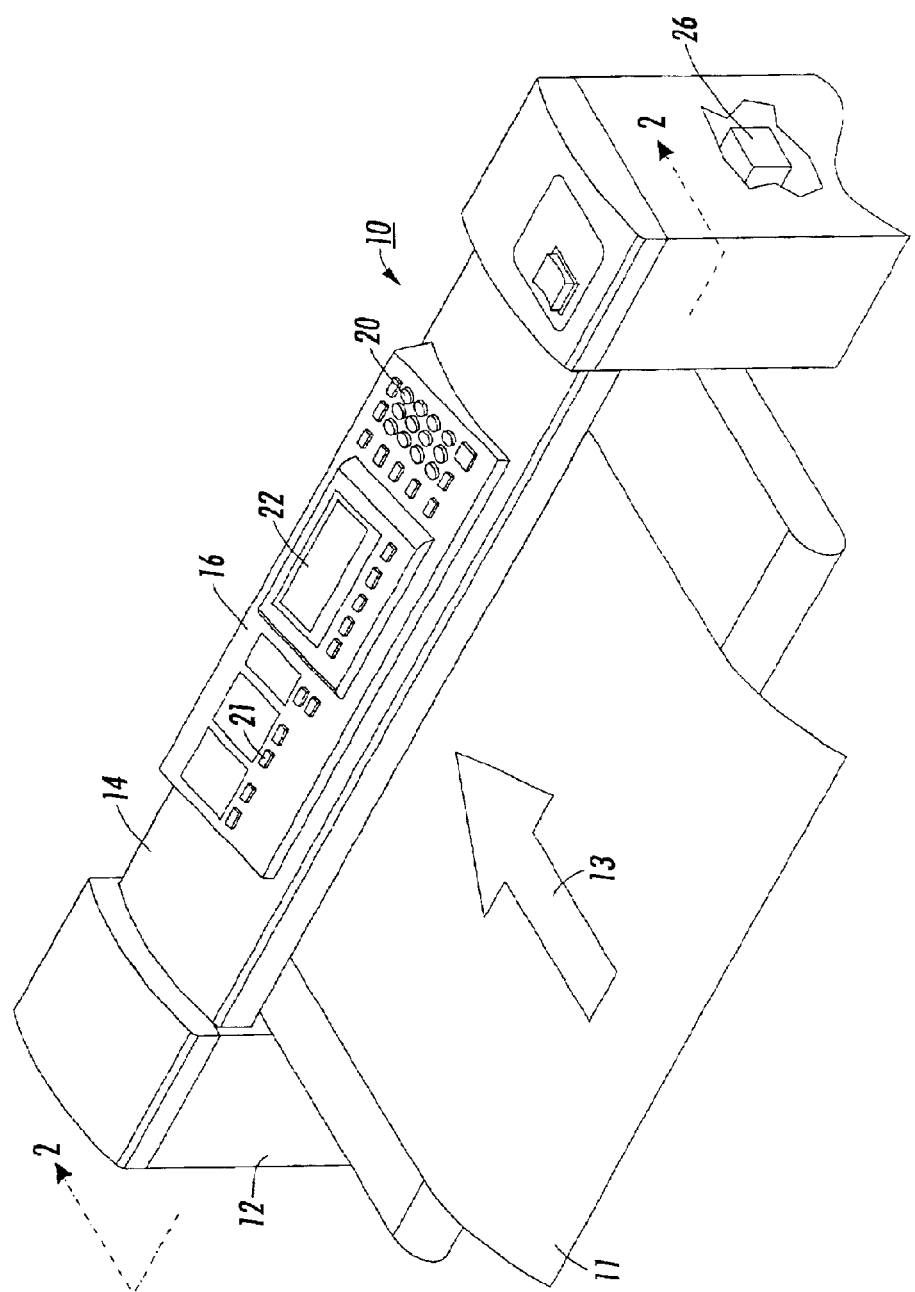
FIG. 1 is a perspective view of a document scanner incorporating the present invention.

The document scanner 10 illustrated in FIG. 1 is particularly designed to handle large format documents 11, such as engineering drawings, that may be up to 36 or more inches wide. Those skilled in the art will recognize after reading the following description that the invention may also be used in scanners designed for smaller documents. The scanner 10 includes a scanner housing 12, a cover 14, and an user interface module 16. The scanner housing 12 encloses an optical element, which may be a lens that focuses an image onto an imaging array, or may include an array of imaging photosensors that receives the image directly. The preferred optical elements are described below. The optical element remains stationary within the housing during a scanning operation, and the document 11 is transported in a first direction 13 of document travel along a document path over the top of the housing 12, to draw the document past the optical element. A removable cover 14 encloses the document path. Other implementations may include moving optical elements and either stationary or moving documents.

A user interface module 16 on the cover provides information about the status of the scanner, and instructions for use. The user interface module 16 may include a keypad 20, control buttons 21, and/or a display screen 22, which screen may be touch sensitive. The detailed construction and features of the user interface module 16 depend on the specific functions and capabilities of the scanner. Also, the user interface module may be in other positions, including on another portion of the housing, or separated from the other elements of the scanner.

A computer 26 in the scanner is programmed to receive image data from the optical element of the scanner and perform various image processing functions on the data. The computer 26 is also connected to the user interface module 16 to receive instructions input by the user and to communicate information to the user through the display 22. The computer 26 may be connected to an external computer or other device (not shown) for further communication or processing of the image data, or to receive information or instructions from an external device. The computer 26 may be a general-purpose microprocessor programmed in accordance with its desired functions.

Figure 2:
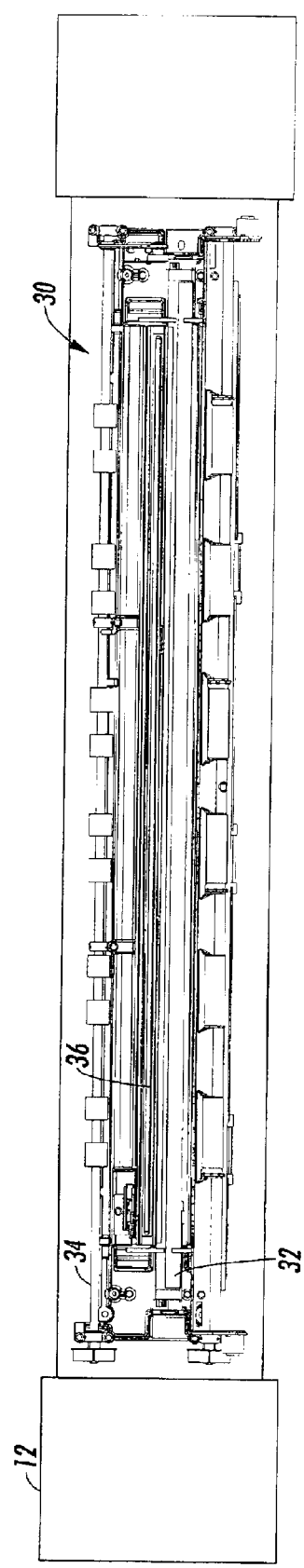
FIG. 2 is a cross-sectional view of a scanner of FIG. 1, taken along line 2—2 of FIG. 1.

Referring next to FIG. 2, the cross-sectional view of the scanner shows an image module 30 enclosed in the scanner housing 12. The image module includes an illumination source, such as a lamp 32, for illuminating a document positioned over the image module. A transport mechanism 34 attached to the image module moves a document to be scanned and the image module 30 relative to one another. In the illustrated embodiment, the transport mechanism moves the document relative to the image module, while the image module remains stationary within the scanner housing 12. However, the transport mechanism may alternatively be designed to move the image module past a stationary, document. A lens 36 admits light reflected from the document into the interior of the image module. The particular embodiment described permits imaging of documents up to 36 inches (91.4 cm) wide. Thus, the lens 36 is 36–37 inches (91.4–94.0 cm) in its long dimension.

Figure 3:
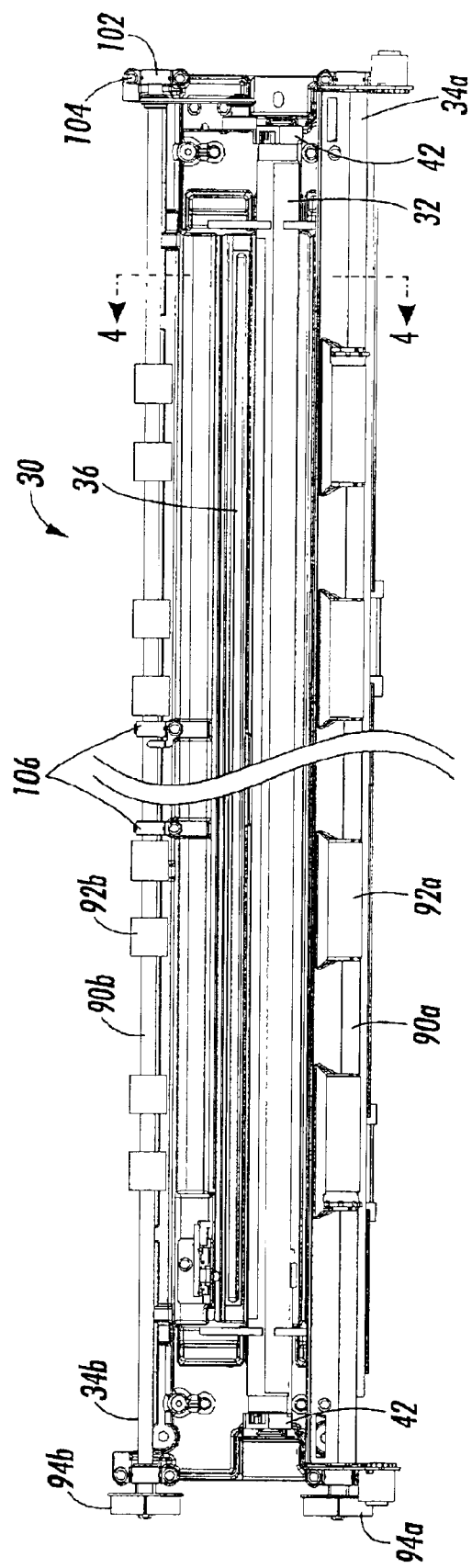
FIG. 3 is a top view of a particular embodiment of an image module incorporating the present invention.
Figure 4:
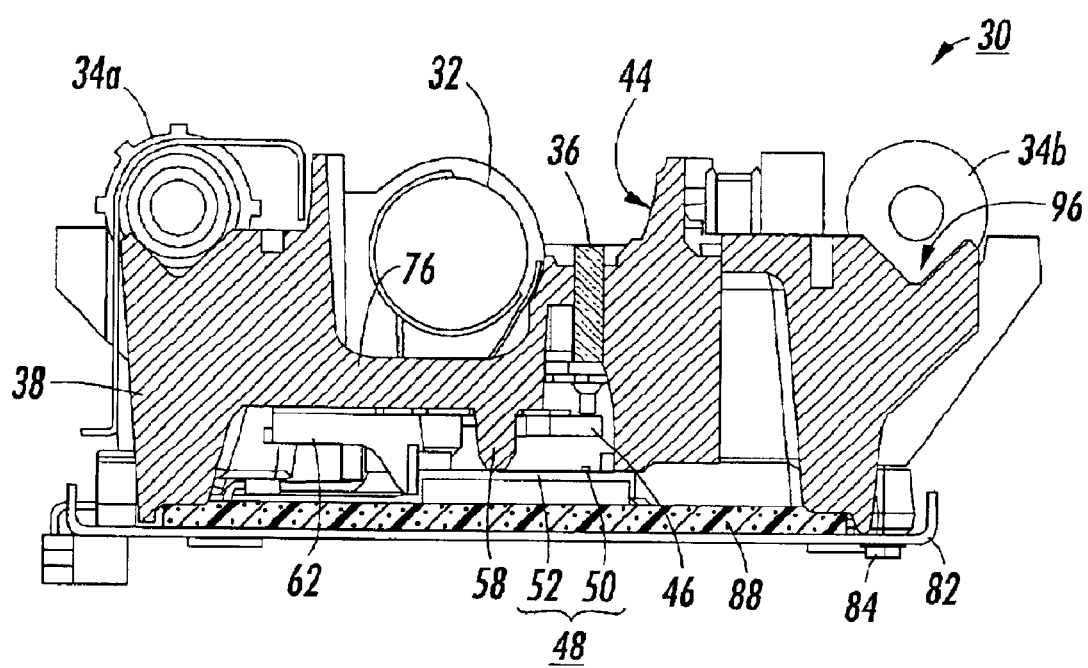
FIG. 4 is a cross-sectional view of the image module of FIG. 3, taken along line 4—4 of FIG. 3.

A more detailed top view of the image module 30 is shown in FIG. 3, and a cross-sectional view of the image module is shown in FIG. 4. The image module includes a module housing 33 for holding the other elements of the image module. The module housing 38 is preferably formed as a single, unitary piece of a rigid material such as aluminum. For example, the module housing may be formed of die cast or molded aluminum. For a 36 inch (91.4 cm) lens, the module housing is approximately 44 inches (112 cm) in its long dimension. The rigid, cast module housing 38 provides a firm reference for relative positioning of the different elements of the image module. This firm reference allows accurate positioning of the other elements relative to one another, and permits maintaining those relative positions.

The lamp 32 is attached to the module housing 38, and provides illumination to a document 11 (FIG. 1) that the transport mechanism 34 moves over the image module 30. The lamp 32 is conventional for a scanner, such as a fluorescent tube. The lamp is mounted in lamp mountings 42 that include conventional electrical contacts for the lamp. Those skilled in the art will recognize that electrical connections are provided to the lamp mountings 42 either through or around the body of the image module housing 38. A reflector 44 (FIG. 4) on the upper surface of the image module housing 38 assists in directing light from the lamp 32 to the document being scanned. The exact nature and configuration of the reflector 44 will depend on the arrangement of the elements of the image module, such as the lamp 32, the lens 36, and the document path.

A document positioned over the image module and illuminated by the lamp 32 reflects light back toward the image module. Light reflected from the document enters the interior of the image module housing through an elongate opening through the top of the image module housing. Referring now to FIG. 4, optical elements, including the lens 36, which may be a SELFOC lens, and infra red filter glass 46, in the elongate housing opening focus and filter the light. The exact type of lens 36 (or lenses) and/or optical filter(s) 46 will depend on the specific scanner application. Those skilled in the art will recognize that the SELFOC lens and the infrared filter may be either permanently or removably mounted on the housing 38. Various types of mountings for the lens and the filter are known in the art. Datum pads attached to the lens 36 help prevent the lens from sagging in the lens opening. The datum pads may be cemented to the lens. A bracket holds the infrared filter. A rubber bumper attached to the bracket presses the bracket against a reference datum on the interior of the housing.

Light entering the interior of the module housing 38 through the SELFOC lens 36 and the infra red filter glass 46 is received by an imaging sensor array 48 in the interior of the image module housing. The imaging sensor array 48 converts light into image data. The image data is directed to the scanner computer 26 (see FIG. 1) or to an external data processing device (not shown). Many types of imaging sensor arrays are known in the art. In the illustrated embodiment, the imaging sensor array includes a number of detector elements 50 mounted in a predetermined pattern on one or more sensor boards 52. In particular, the detector elements 50 are mounted in a linear arrangement on the sensor board 52. The linear arrangement of detector elements 50 is perpendicular to the direction of document travel 13 (see FIG. 1). Each detector element 50 may be a CMOS detector element that generates a signal (usually digital) representative of the light that impinges that detector element. For example, 100–400 (or sometimes more) detector elements may be included in each inch of the linear array of detector elements, with each detector element corresponding to one image pixel. Thus, the linear arrangement of detector elements generates a set of signals representative of the light from a one pixel wide line extending across the document, perpendicular to the direction of document travel 13. The scanner (or external computer receiving the signals from the scanner) combines the signals to recreate the image on the document.

Figure 5:
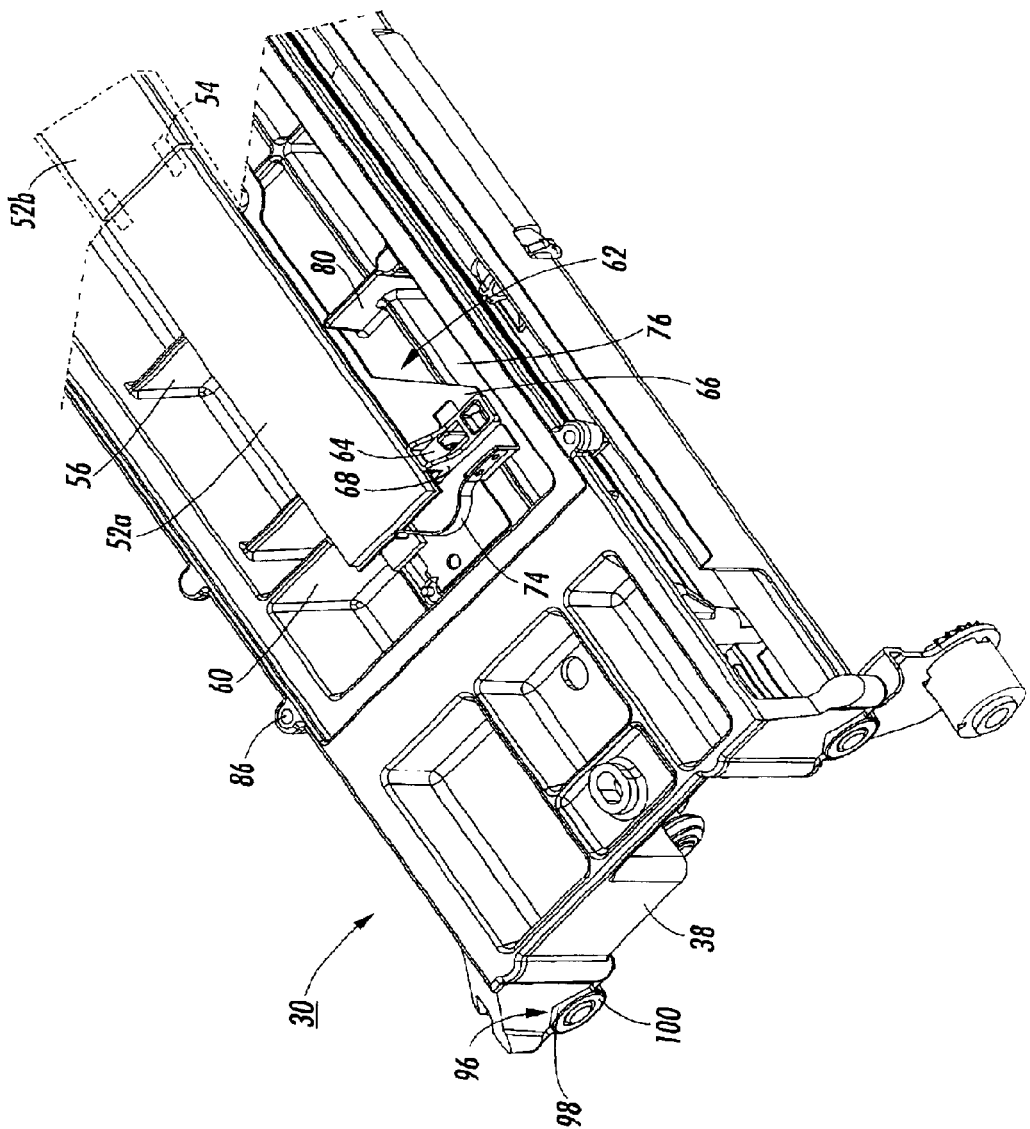
FIG. 5 is a perspective view of the underside of the image module of FIG. 3.

For a scanner capable of scanning wide format documents, a linear imaging sensor array of adequate width to generate a signal representative of the entire width of the document may not be available. In such a case, an imaging sensor array 48 smaller than the width of the document may be used. The lens 36 may be constructed to optically reduce the image of the document to the size of the imaging sensor array, or the imaging sensor array may be laterally movable within the image module housing. However, the preferred arrangement is to use a full width imaging sensor array 48 having detector elements 50 mounted in a linear arrangement that extends at least equal to the width of the document being scanned. The imaging sensor array may be formed of two or more separate imaging sensor sub-arrays, as seen in the view of FIG. 5. FIG. 5 shows the underside of the image module 30, so the back surface of each imaging sensor sub-array is visible. Each sub-array includes a linear arrangement of detector elements on a sensor board 52a, 52b, with the detector elements of the imaging sensor sub-arrays aligned with one another. For example, a 36-inch (94.1 cm) linear array may be formed of three 12-inch (31 cm) linear arrays assembled together. Preferably, the sensor boards are attached to one another. One particular mechanism for attaching sensor boards together is to attach the sub-assembly sensor boards 52a, 52b to one another using glass tie bars 54 attached to the sensor boards using a light-curable adhesive. The glass tie bars 54 are preferably attached to the front surface of each sub-assembly sensor board 52a, 52b. Such an assembly technique is described in pending U.S. patent application Ser. No. 09/677,742, filed Oct. 3, 2000, entitled "Assembly of Imaging Arrays for Large Format Documents," by inventor Kraig A. Quinn.

The imaging sensor array 48 is accurately positioned in the vertical plane of the image module by an array support element 56 (FIG. 5). The array support element positions the imaging sensor array 48 so that the detector elements 50 of the imaging array are accurately positioned in the vertical dimension with respect to the housing 38, and thus to the lens 36 and the document path. Such accurate positioning of the detector elements 50 helps permit properly placing a document being scanned at the focal point of the detector elements. In the particular embodiment illustrated, the array support element includes a plurality of array support ribs 56 extending vertically from the top wall of the housing 38 into the interior of the housing. The array support ribs abut the front surface of each sensor board 52, which surface contains the detector elements. The horizontal ends of the array support ribs that support the front surface of the sensor boards are cast or machined to a high level of precision, to facilitate the accurate positioning of the detector elements of the imaging sensor array with respect to the housing. Each array support rib is discontinuous around the detector elements on the sensor board. The array support element may additionally include other ribs 58 extending from the top wall of the housing, along at least a portion of the length of the housing.

The imaging sensor array 48 is accurately positioned in the horizontal plane of the image module by aligning the imaging sensor array with a datum element provided as part of the housing. In the embodiment illustrated, the datum element is formed as part of the housing, and includes a series of datum ribs 60 projecting from a side wall of the housing into the interior of the housing. One exemplary datum rib is shown in FIG. 5. Additional datum ribs are spaced at intervals along the length of the housing. The vertical ends of the datum ribs are cast or machined to a high level of precision, to facilitate the accurate positioning of the imaging sensor array with respect to the housing.

A plurality of array bias clips 62 urge the imaging sensor array 48 against the datum ribs 60, to maintain the horizontal position of the detector elements 50 of the imaging sensor array relative to the housing 38. The array bias clips 62 abut a rearward edge of the sensor board 52 to urge a forward edge of the sensor board of the imaging sensor array against the datum ribs. As is known in the art, the detector elements 50 may be accurately positioned on the sensor board 52 relative to a forward edge of the sensor board. Therefore, providing an accurate reference point in the housing (through the datum ribs) for the forward edge of the sensor board facilitates accurately positioning the detector elements 50 with respect to the housing 38, and thus with respect to the lens 36.

Figure 6:
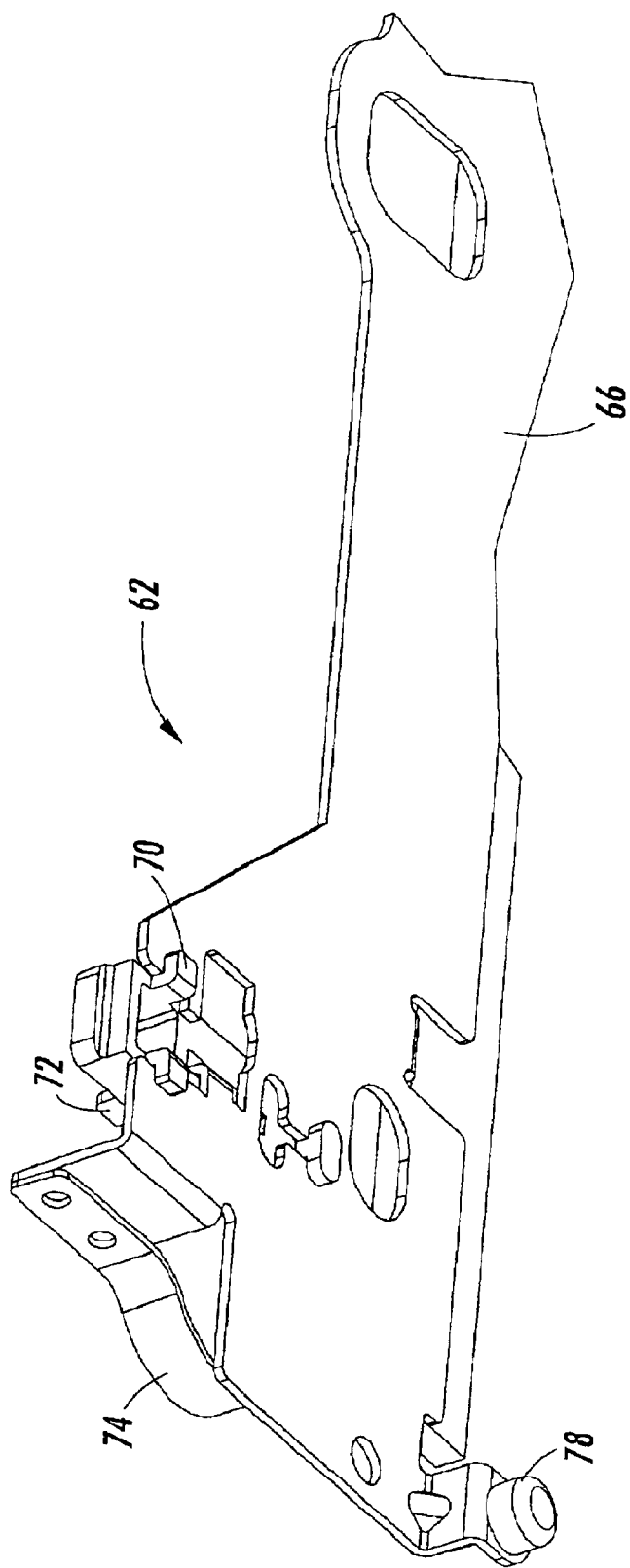
FIG. 6 is a perspective view of a bracket incorporated in the image module of FIG. 3.

The components of the array bias clip 62 are formed of sheet metal or a similar material. As seen in FIGS. 5 and 6, the array bias clip includes a spring element 64 that presses against the rearward edge of the sensor board. The spring element is supported on a bracket 66. In the illustrated embodiment, the spring element includes a contact bar 68 that forms the forward edge of the spring element for contacting the rearward edge of the sensor board, and a clip structure that engages a cut-out in the bracket 66. A vertical projection 72 from the bracket extends through an opening in the spring element and contacts one end of a tubular component element, which in turn presses against the contact bar. Additional array bias clips 62 are placed along the length of the imaging sensor array.

One end of the image module housing 38 also includes a side reference element (not shown), preferably formed as part of the housing casting. The side reference element may include one or more ribs in the interior of the housing, or the interior surface of the side wall of the housing itself. A lateral spring 74 is attached to the bias element bracket that is at the far end of the imaging sensor array. The lateral spring 74 urges the imaging sensor array 48 against the lateral reference element to further assist in accurately positioning the detector elements of the imaging sensor array within the housing. One lateral spring 74 at the end of the sensor array is generally sufficient to maintain the lateral horizontal position of the sensor array. Therefore, the array bias clips positioned at other positions along the length of the imaging sensor array do not include the lateral spring.

The bias clip bracket 66 may extend partially along the front surface of the sensor board 52. The bias clip bracket 66 should be configured relative to the sensor board 52 so that the bias clip bracket does not interfere with the detector elements 50 on the front surface of the sensor board. The bias clip bracket is supported in the housing by bias support elements, such as bias support ribs 76 that extend longitudinally and/or laterally in the interior of the housing (see FIGS. 4 and 5). Feet 78 on the bias clip bracket (FIG. 6) fit into indentations or openings (not shown) in the bias support ribs 76 of the housing. Additional bias reference ribs 80 engage the edge of the bias clip bracket 66 to help retain the bias clip bracket in position.

A bottom cover 82 encloses the housing (FIG. 4) to hold the elements inside the housing in place. The bottom cover 82 is formed of sheet metal and is attached to the housing with screws or bolts 84 that engage openings 86 in the housing (FIG. 5). A resilient seal 88, formed of a material such as foam, is enclosed between the bottom cover 82 and the outer walls of the module housing 38 to prevent light from entering the interior of the housing from around the bottom cover. The resilient seal 82 is a single piece that covers the entire interior of the module housing. The material of the seal 88 is resilient, so that it seals tightly against the edges of the housing. The bottom cover 82 also includes inwardly directed coined in bumps to press (squeeze) the seal 88 at certain points against the back surface of the sensor board 52, to hold the image sensor array firmly and evenly against the array support ribs 56. The material should also be able to withstand the high temperatures at which the scanner is expected to operate. Cellular foam such as Poron® foam, available from Rogers Corporation of Rogers, Conn. may be used. Such cellular foam resists permanent deformation, which provides over a long term predictable force to the elements in the module housing. In addition, a skin-like surface on the entire surface of the foam seal prevents the foam from emitting dust-like particles that may interfere with scanner operation. The cut edge of the foam seal 88 at its perimeter (which is a potential source of particles) is sealed outside the interior space of the module housing by appropriate shaping of the interface between the edges of the bottom cover 82 and the edges of the housing 38.

An alternative to the seal covering the entire area of the housing interior is a gasket placed between the perimeter of the housing body and the bottom cover. The gasket seals light as well as dust and other debris from the interior of the housing. Separate low density foam buttons positioned between the bottom cover and the image sensor array hold the image sensor array against the array support ribs.

A transport mechanism 34 for moving the document to be scanned 11 (FIG. 1) and the imaging sensor array 48 relative to one another is attached to the housing 38. As described above, the imaging sensor array is accurately positioned with respect to the housing. Accurate positioning of the transport mechanism with respect to the housing provides accurate relative positioning of the transport mechanism and the imaging sensor array, which in turn ensures accurate alignment of the document being scanned and the imaging sensor array. In the particular embodiment illustrated, the transport mechanism 34 is designed to move the document 11 across the image module 30, and past the imaging sensor array 48. However, those skilled in the art will recognize that the transport mechanism may be designed to move the housing with the imaging sensor array past a stationary document.

Referring again to FIGS. 3 and 4, the transport mechanism includes two document transport elements 34a, 34b. Each transport element includes a drive shaft 90a, 90b, and paper contact devices, such as document rollers 92a, 92b. An extension at one end of each drive shaft includes a pulley wheel 94a, 94b for engaging a drive belt (not shown) when the image module is installed in the scanner housing. The drive belt is driven by a motor (not shown) inside the scanner housing for rotating the drive shafts of the document transport mechanism. Preferably, corresponding components of both drive elements are of the same size, so that when driven by the drive belt, the document drive shafts rotate at the same speed to consistently pull a document past the lens 36.

The document drive shafts 90a, 90b are accurately and precisely positioned with respect to the module housing 38, and are securely affixed to the housing. For example, a V shaped formation 96 at each end of the module housing receives an axle mount 98 that has a corresponding V shape (see FIG. 5). The axle mount 98 holds an axle end bearing 100 that surrounds the drive shaft 90a, 90b. Axle bearing covers 102 secure the axle end bearings 100 to the housing 38. Attaching devices such as machine screws 104 attach the axle bearing covers to the housing, thereby fixing the position of each drive shaft 90a, 90b with respect to the housing. So attaching the document transport mechanism 34 to the housing to which the imaging sensor array is also accurately positioned eliminates (or at least reduces) document skew induced by poorly aligned document transport mechanisms and scanning arrays.

Scanners for particularly wide format documents may include intermediate axle bearings 106 holding the drive shafts 90a, 90b. Referring, for example, to FIG. 3, intermediate bearing mounts are attached to the housing, and hold the intermediate axle bearings that enclose the drive shaft. Such bearing mounts and their attachment are well understood in the art.

The image module described above is fully contained with many of the critical components for a document scanner accurately positioned with respect to the image module housing. The lens, the imaging sensor array, the lamp, and the document transport mechanism are thereby contained in an integrated image module, providing for highly accurate location of the components. The complete image module may be installed in a document scanner housing without disrupting or disturbing the positional relationship among the elements.

The scanner cover 14 (FIG. 1) includes a document backing structure that holds the document 11 at a predetermined vertical distance from the lens 36 and the detector elements 50 of the imaging sensor array. During a scanning operation, the document backing structure holds the document at the focal plane of the detector elements 50 as the document transport mechanism 34 moves the document past the lens 36. Such backer structures are known in the art. One innovative document backer structure that also incorporates features that facilitate scanner calibration is described in U.S. patent application Ser. No. 09/745,139 filed Dec. 20, 2000 by Daniel L. Morris, Christopher J. Spencer, Michael J. Poirier, and Timothy G. Shelhart, which application is hereby incorporated by reference.

Upon reading the above description of a preferred embodiment, persons skilled in the art will recognize various modifications that can be made to the specific embodiment without departing from the present invention. For example, changes can be made to the specific shape and configuration of the housing, and particularly the support and datum elements. In addition, various other types of bias clips and even other types of mechanisms for retaining the positions of the components will become apparent. Therefore, the invention is not to be limited to the specific implementation described above.

We claim:

1. An image module for a document scanner, the image module comprising:

a molded housing having a datum element;

an imaging sensor array;

an array bias element urging the imaging sensor array against the datum element; and a transport mechanism attached to the housing;

wherein the housing comprises a unitary casting;

wherein the sensor array has opposed forward and rearward edges;

wherein the array bias element comprises a spring clip abutting the rearward edge of the imaging sensor array to urge the forward edge of the imaging sensor array against the datum element; and, wherein the imaging sensor array comprises a board having a front surface and a back surface, and a plurality of sensor elements on the front surface of the board.

2. The image module of claim 1, wherein the board comprises plural boards, each having a front surface and a back surface.

3. The image module of claim 2, wherein the plural boards are attached to one another.

4. The image module of claim 3, additionally comprising a resilient seal and a bottom cover attached to the housing.

5. The image module of claim 4, wherein the document transport mechanism comprises a drive shaft and a paper contact device.

6. A document scanner comprising:

a housing having a datum element and a support element;

an imaging sensor array comprising:

a sensor board having a forward edge and a rearward edge, and a front surface and a back surface, wherein the front surface of the sensor board abuts the support element; and a plurality of sensor elements on the front surface of the sensor board;

a spring clip abutting the rearward edge of the imaging sensor array to urge the forward edge of the imaging sensor array against the datum element;

a lens attached to the housing above the sensor elements of the imaging sensor array;

a lamp mounting on the housing; and a transport mechanism attached to the housing, wherein the transport mechanism moves the housing and a document relative to one another.

7. The scanner of claim 6, wherein:

the datum element comprises a plurality of datum ribs; and the support element comprises a plurality of support ribs.

8. The scanner of claim 6, wherein the housing additionally includes a side reference element, and the scanner additionally comprises a lateral spring for urging an edge of the sensor board against the reference edge.

9. The scanner of claim 8, wherein the sensor board includes first and second opposed side edges between the forward and rearward edges, and the lateral spring abuts the first side edge to urge the second side edge against the side reference element.

10. The scanner of claim 6, wherein the transport mechanism is a document transport mechanism for moving the document relative to the housing.

11. A method of assembling a document scanner, the method comprising:

providing a housing having a support element and a datum element;

placing an imaging sensor array on the support surface of the housing;

urging the imaging sensor array against the datum element;

attaching a document transport mechanism to the housing;

attaching a bottom cover to the housing to enclose the imaging sensor array; and enclosing a resilient seal between the imaging sensor array and the bottom cover.

12. A method of assembling a document scanner, the method comprising:

providing a housing having a support element and a datum element;

placing an imaging sensor array on the support surface of the housing;

urging the imaging sensor array against the datum element;

attaching a document transport mechanism to the housing; and attaching a bottom cover to the housing to enclose the imaging sensor array;

wherein the housing additionally has a reference element substantially perpendicular to the datum element, and the method additionally comprises urging a second edge of the imaging sensor array against the reference element.

13. An image module for a document scanner, the image module comprising:

a molded housing having a datum element;

an imaging sensor array oriented for receiving an image from a first direction;

an array bias element urging the imaging sensor array in a second direction, different from the first direction, against the datum element; and a transport mechanism attached to the housing;

wherein the second direction is substantially perpendicular to the first direction.

14. A method of assembling a document scanner, the method comprising:

providing a housing having a support element and a datum element;

placing an imaging sensor array on the support surface of the housing so that the imaging sensor array is oriented to receive images from a first direction;

urging the imaging sensor array in a second direction, different from the first direction, against the datum element;

attaching a document transport mechanism to the housing; and attaching a bottom cover to the housing to enclose the imaging sensor array;

wherein the second direction is substantially perpendicular to the first direction.

\* \* \* \* \*